(Model.)
C. McDONALD.
SOLDERING APPARATUS.
No. 306,028. Patented Sept. 30, 1884.
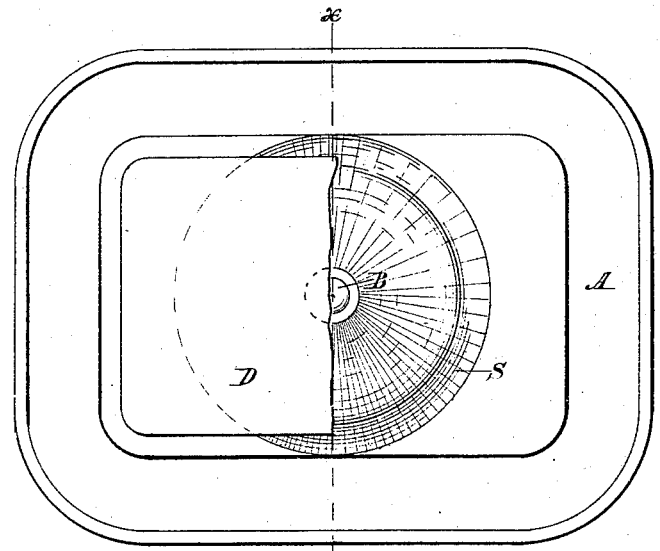
Fig 1
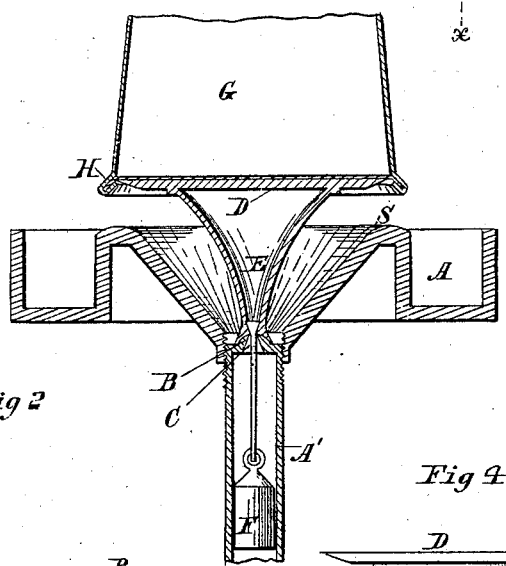
Fig 2
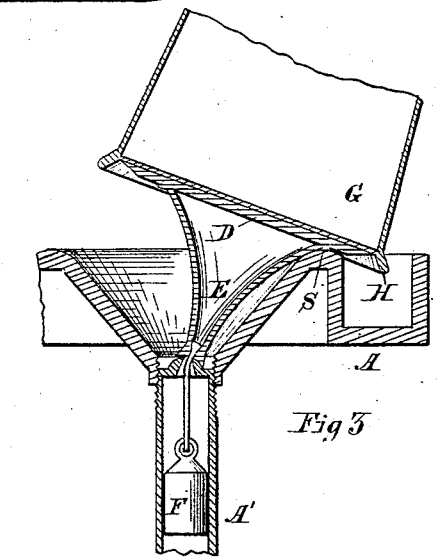
Fig 3
Fig 4
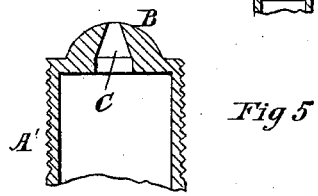
Fig 5
Witnesses
Thomas H. Pease
W. C. Coolies
Inventor
Charles McDonald
By Coburn & Thacher
Attorneys

United States Patent Office.

CHARLES McDONALD, OF CHICAGO, ILLINOIS, ASSIGNOR OF ONE-HALF TO GEORGE H. WEBSTER, OF SAME PLACE.

SOLDERING APPARATUS.

SPECIFICATION forming part of Letters Patent No. 306,028, dated September 30, 1884.

Application filed July 25, 1881. (Model.)

*To all whom it may concern:*

Be it known that I, CHARLES McDONALD, a citizen of the United States, residing at Chicago, in the county of Cook and State of Illinois, have invented a certain new and Improved Soldering Apparatus, of which the following is a specification, reference being had to the accompanying drawings, in which—

Figure 1 is a top or plan view; Fig. 2, a vertical section taken at the line *x x*, Fig. 1; Fig. 3, the same section, showing the can-holder tipped in position to carry the seam to be soldered into the melted solder. Fig. 4 shows a detached view of the can-holder, and Fig. 5 a detached view of the pipe and seat on which the can-holder rests.

My invention relates to that class of soldering apparatus with which soldering is done by dipping the seam to be soldered into molten solder.

The invention consists in the particular means for facilitating this process, which I will now proceed to describe, and will afterward point out definitely in the claims.

A represents a solder trough or receptacle, and is made of any suitable material for holding solder. It is peripheral—that is to say, so shaped that the solder surrounds an empty space in the middle, in which the support for the can is placed. This construction is illustrated in Figs. 1 and 2.

A' is a tube or pipe, which screws into the central portion of the receptacle A, as clearly shown in the drawings. At the upper end of this pipe is a rounded seat, B, with an opening, C, through its center.

D is a plate or receptacle adapted to receive the vessel whose seam is to be soldered. This plate is supported upon the base E. This base is so formed at its lower end as to rest upon the seat and form what is known as a "ball-and-socket joint."

F is a weight, which is suspended within the tube A' from the center of the base E in such a manner as to hold it, when left in its normal position, in the position shown in Fig. 2.

G represents a can placed upon the can-holder, and H is the seam that is to be soldered.

In Fig. 3 the can-holder and can are shown tipped toward the side, so as to throw the seam to be soldered, or a part of it, into the molten solder held in the receptacle A, and when thrown in that position the can-holder strikes upon the shoulder S of the receptacle A. By rolling the can-holder around on the shoulder, the entire seam to be soldered will be dipped into the molten solder, and the part which has received the solder is rolled out of the solder in such a manner that the solder flows down continually toward the solder trough or receptacle, and leaves a perfectly smooth seam, leaving no drippings or drops to cool on the vessel soldered. The central base of the soldering-trough is screwed on the tube A', which constitutes its support, as shown in Fig. 2, so that it can be raised or lowered, and the depth to which the seam is dipped into the solder trough or receptacle can be regulated; or, without departing from the principle of this construction, the trough may be supported on legs or otherwise independently of the tube A', which can then be raised and lowered, producing the same effect on the relative height of the can and trough.

I have shown in the accompanying drawings a soldering apparatus adapted to soldering the tops and bottoms into square cans with round corners, such as are extensively used in canning corned beef; but cans or utensils of other shapes can be soldered by varying the form of the solder-receptacle and the can-holder. I have also shown a ball-and-socket joint for tilting the can-holder to carry the seam to be soldered into the molten solder; but any equivalent joint may be used.

Having specifically described my invention, what I claim as new, and desire to secure by Letters Patent, is—

1. The peripheral solder-trough, in combination with the oscillating can-holder arranged centrally to said trough, substantially as and for the purpose described.

2. In a soldering apparatus, the can-holder mounted on a support which admits of its oscillating in every direction, and provided with a centrally-suspended balancing-weight, substantially as and for the purpose described.

3. In a soldering apparatus, the rotating can-holder mounted upon a support which admits of its oscillating thereon in every direction, substantially as and for the purpose described.

4. The tube A', having the rounded upper end, B, in combination with the can-holder base E, having a corresponding re-entrant curvature on its bottom, and the weight F, suspended from said bottom, substantially as and for the purpose described.

5. The support A' of the can-holder, in combination with the trough A, surrounding the can-holder, and having a base arranged beneath the can-holder and vertically adjustable on the support A', substantially as and for the purpose described.

CHARLES McDONALD.

Witnesses:
JNO. C. MACGREGOR,
W. C. CORLIES.